US012524658B2

(12) United States Patent
Norrie et al.

(10) Patent No.: US 12,524,658 B2
(45) Date of Patent: *Jan. 13, 2026

(54) SPECIAL PURPOSE NEURAL NETWORK TRAINING CHIP

(71) Applicant: Google LLC, Mountain View, CA (US)

(72) Inventors: Thomas Norrie, Mountain View, CA (US); Olivier Temam, Antony (FR); Andrew Everett Phelps, Middleton, WI (US); Norman Paul Jouppi, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 866 days.

This patent is subject to a terminal disclaimer.

(21) Appl. No.: 17/694,598

(22) Filed: Mar. 14, 2022

(65) Prior Publication Data

US 2022/0261622 A1    Aug. 18, 2022

Related U.S. Application Data

(63) Continuation of application No. 15/983,056, filed on May 17, 2018, now Pat. No. 11,275,992.

(Continued)

(51) Int. Cl.
    *G06N 3/08*    (2023.01)
    *G06F 9/30*    (2018.01)
    (Continued)

(52) U.S. Cl.
    CPC .......... *G06N 3/063* (2013.01); *G06F 9/3001* (2013.01); *G06F 9/30032* (2013.01);
    (Continued)

(58) Field of Classification Search
    None
    See application file for complete search history.

(56) References Cited

U.S. PATENT DOCUMENTS

| 5,423,051 A | 6/1995 | Fuller et al. |
| 5,544,336 A | 8/1996 | Kato et al. |

(Continued)

FOREIGN PATENT DOCUMENTS

| CN | 102521179 A | 6/2012 |
| CN | 104011672 A | 8/2014 |

(Continued)

OTHER PUBLICATIONS

EP Office Action in European Application No. 18735433.7, dated Dec. 17, 2020, 7 pages.

(Continued)

*Primary Examiner* — David R Vincent
(74) *Attorney, Agent, or Firm* — Fish & Richardson P.C.

(57) ABSTRACT

Methods, systems, and apparatus including a special purpose hardware chip for training neural networks are described. The special-purpose hardware chip may include a scalar processor configured to control computational operation of the special-purpose hardware chip. The chip may also include a vector processor configured to have a 2-dimensional array of vector processing units which all execute the same instruction in a single instruction, multiple-data manner and communicate with each other through load and store instructions of the vector processor. The chip may additionally include a matrix multiply unit that is coupled to the vector processor configured to multiply at least one two-dimensional matrix with a second one-dimensional vector or two-dimensional matrix in order to obtain a multiplication result.

17 Claims, 4 Drawing Sheets

Related U.S. Application Data (60) Provisional application No. 62/507,771, filed on May 17, 2017.

(51) Int. Cl.
   *G06F 9/38* (2018.01)
   *G06F 17/16* (2006.01)
   *G06N 3/063* (2023.01)
   *G06N 3/084* (2023.01)

(52) U.S. Cl.
   CPC ...... *G06F 9/30036* (2013.01); *G06F 9/30141* (2013.01); *G06F 9/3885* (2013.01); *G06F 9/3887* (2013.01); *G06F 17/16* (2013.01); *G06N 3/08* (2013.01); *G06N 3/084* (2013.01)

(56) References Cited

U.S. PATENT DOCUMENTS

| | | | |
|---|---|---|---|
| 5,872,988 | A | 2/1999 | Duranton |
| 7,305,540 | B1 | 12/2007 | Trivedi et al. |
| 9,898,441 | B2 | 2/2018 | Narayanaswami et al. |
| 10,055,692 | B1 | 8/2018 | Mclaren et al. |
| 2003/0182518 | A1 | 9/2003 | Nakanishi |
| 2013/0073495 | A1 | 3/2013 | Izhikevich et al. |
| 2015/0378734 | A1* | 12/2015 | Hansen ............... G06F 9/30181 712/226 |
| 2016/0342889 | A1 | 11/2016 | Thorson et al. |
| 2016/0342891 | A1 | 11/2016 | Ross et al. |
| 2016/0378465 | A1 | 12/2016 | Venkatesh et al. |
| 2017/0097884 | A1 | 4/2017 | Werner et al. |
| 2017/0132496 | A1 | 5/2017 | Shoaib et al. |
| 2019/0347125 | A1* | 11/2019 | Sankaran ............... G06F 9/3877 |
| 2019/0354862 | A1 | 11/2019 | Ross et al. |
| 2020/0167530 | A1* | 5/2020 | Buchanan ............... G06N 3/065 |

FOREIGN PATENT DOCUMENTS

| | | |
|---|---|---|
| CN | 106503797 A | 3/2017 |
| EP | 0581828 | 1/1997 |
| EP | 1569128 | 6/2015 |
| JP | H04-290155 A | 10/1992 |
| JP | 5841071 | 1/2016 |
| JP | 2017-138966 A | 8/2017 |
| JP | 2018-513475 | 5/2018 |
| JP | 2018-531467 | 10/2018 |
| KR | 20160046623 A | 4/2016 |
| WO | WO 2002/084451 | 10/2002 |
| WO | WO 2013/101210 | 7/2013 |
| WO | WO 2016/171909 | 10/2016 |
| WO | WO 2016/171928 | 10/2016 |
| WO | WO 2016171928 A1 | 10/2016 |
| WO | WO 2016/186801 | 11/2016 |
| WO | WO 2017/068318 | 4/2017 |

OTHER PUBLICATIONS

IN Office Action in Indian Application No. 201947035705, dated Jun. 14, 2021, 7 pages (with English translation).

International Search Report and Written Opinion issued in International Application No. PCT/US2018/033215, mailed on Aug. 22, 2018, 15 pages.

JP Office Action in Japanese Application No. 2019-549507, dated Apr. 6, 2021, 5 pages (with English translation).

KR Office Action in Korean Application No. 10-2019-7026557, dated Oct. 20, 2020, 8 pages (with English translation).

KR Office Action in Korean Application No. 10-2019-7026557, dated Apr. 28, 2021, 8 pages (with English translation).

PCT International Preliminary Report on Patentability in International Application No. PCT/US2018/033215, dated Nov. 19, 2020, 9 pages.

TW Office Action in Taiwan Application No. 107116869, dated May 15, 2019, 10 pages (with English translation).

TW Office Action in Taiwan Application No. 107116869m dated Mar. 17, 2020, 5 pages (with English translation).

EP Extended Search Report in European Appln. No. 22171943.8, dated Oct. 4, 2022, 6 pages.

Extended Search Report in European Appln. No. 24163748.7, mailed on Jul. 10, 2024, 6 pages.

Notice of Allowance in Japanese Appln. No. 2023-114361, mailed on Aug. 27, 2024, 7 pages (with English translation).

Notice of Allowance in Korean Application No. 10-2022-7045015, mailed on Jan. 24, 2024, 3 pages (with English translation).

Notice of Allowance in Taiwan Application No. 112130161, mailed on Jun. 14, 2024, 21 pages (with English translation).

Shimokawa et al., "Digital Neurocomputer, Multineuro," Toshiba Review, Dec. 1991, 46(12):931-934 (English abstract).

Saito Yasutake, "Deep Learning—First Edition" O'Reilly Japan, Sep. 2016, 50 pages.

CN Office Action in Chinese Appln. No. 201880018006.8, dated Dec. 1, 2022, 26 pages (with English Translation).

JP Office Action in Japanese Patent Appln. No. 2021-142529, dated Nov. 22, 2022, 7 pages (with English Translation).

Office Action in Taiwanese Appln. No. 111120440, dated Feb. 3, 2023, 4 pages (with English Translation).

Jiyu et al., "A Basic-Block Reordering Algorithm Based on Neural Networks," Acta Scientiarum Naturalium Universitatis Pekinensis, Jan. 2011, 47:9-16 (with English abstract).

Office Action in Chinese Appln. No. 202310655432.5, mailed on Aug. 22, 2025, 29 pages (with English translation).

Office Action in Korean Appln. No. 10-2022-7045015, mailed on Nov. 27, 2025, 4 pages (with English translation).

* cited by examiner

SPECIAL PURPOSE NEURAL NETWORK TRAINING CHIP

CROSS-REFERENCE TO RELATED APPLICATIONS

This is a continuation of U.S. application Ser. No. 15/983,056, filed on May 17, 2018, which claims priority to U.S. Provisional Application No. 62/507,771, filed on May 17, 2017. The disclosures of the prior applications are considered part of and are incorporated by reference in the disclosure of this application.

BACKGROUND

This specification relates to performing neural network computation in hardware. Neural networks are machine learning models that each employ one or more layers of models to generate an output, e.g., a classification, for a received input. Some neural networks include one or more hidden layers in addition to an output layer. The output of each hidden layer is used as input to the next layer in the network, i.e., the next hidden layer or the output layer of the network. Each layer of the network generates an output from a received input in accordance with current values of a respective set of parameters.

SUMMARY

This specification describes technologies relating to special-purpose hardware chips that are programmable linear algebra accelerators optimized for machine learning workloads, specifically a training phase.

In general, one innovative aspect of the subject matter described in this specification can be embodied in a special hardware chip.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination.

A special-purpose hardware chip for training neural networks may include: a scalar processor configured to control computational operation of the special-purpose hardware chip; a vector processor configured to have a 2-dimensional array of vector processing units which all execute the same instruction in a single instruction, multiple-data manner and communicate with each other through load and store instructions of the vector processor; and a matrix multiply unit that is coupled to the vector processor configured to multiply at least one two-dimensional matrix with a second one-dimensional vector or two-dimensional matrix in order to obtain a multiplication result.

A vector memory may be configured to provide fast, private memory to the vector processor. A scalar memory may be configured to provide fast, private memory to the scalar processor. A transpose unit may be configured to perform a transposition operation of a matrix. A reduction and permutation unit may be configured to perform a reduction on numbers and permute the numbers among different lanes of the vector array. A high-bandwidth memory may be configured to store data of the special-purpose hardware chip. The special purpose hardware chip may include a sparse computation core.

The special purpose hardware chip may include an interface and an inter-chip interconnect, which connects the interface or resources on the special purpose hardware chip to other special purpose hardware chips or resources.

The special-purpose hardware chip may include high bandwidth memory. The inter-chip interconnect may connect the interface and the high bandwidth memory to other special-purpose hardware chips. The interface may be a host interface to a host computer. The interface may be a standard network interface to a network of host computers.

The subject matter described in this specification can be implemented in particular embodiments so as to realize one or more of the following advantages. A special-purpose hardware chip contains processors that natively support higher dimensional tensors (i.e., 2-dimensional and higher) in addition to conventional 0 and 1-dimensional tensor computations while also being optimized for 32-bit or lower precision computations for machine learning.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A neural network having multiple layers can be trained and then used to compute inferences. Generally, some or all of the layers of the neural network have parameters that are adjusted during the training of the neural network. For example, some or all of the layers can multiply a matrix of parameters, also referred to as weights, for the layer with an input to the layer as part of generating a layer output. The values of the parameters in the matrix are adjusted during the training of the neural network.

In particular, during training, the training system performs a neural network training procedure to adjust the values of the parameters of the neural network, e.g., to determine trained values of parameters from initial values of the parameters. The training system uses backward propagation of errors, known as backward propagation, in conjunction with an optimization method to compute gradients of an objective function with respect to each of the parameters of the neural network and uses the gradients to adjust the values of the parameters.

The trained neural network can then compute inferences using forward propagation, i.e., processing input through the layers of the neural network to generate a neural network output for the input.

For example, given an input, the neural network can compute an inference for the input. The neural network computes this inference by processing the input through each of the layers of the neural network. In some implementations, the layers of the neural network are arranged in a sequence.

Therefore, in order to compute an inference from a received input, the neural network receives the input and processes it through each of the neural network layers in the sequence to generate the inference, with the output from one neural network layer being provided as input to the next neural network layer. Data inputs to a neural network layer, e.g., either the input to the neural network or the outputs of the layer below the layer in the sequence, to a neural network layer can be referred to as activation inputs to the layer.

In some implementations, the layers of the neural network are arranged in a directed graph. That is, any particular layer can receive multiple inputs, multiple outputs, or both. The layers of the neural network can also be arranged so that an output of a layer can be sent back as an input to a previous layer.

An example system is a high-performance multi-chip tensor computation system that is optimized for matrix multiplication and other calculations of multiple dimensional arrays. These operations are important for training neural networks and, optionally, for using the neural networks to compute inferences.

Within an example system, multiple special purpose chips are arranged to distribute operations in order for the system to efficiently perform training and inference calculations. In one implementation, there are four chips on a board, and in a larger system, many boards are next to each other in a rack or are other otherwise in data communications with one another.

Figure 1:
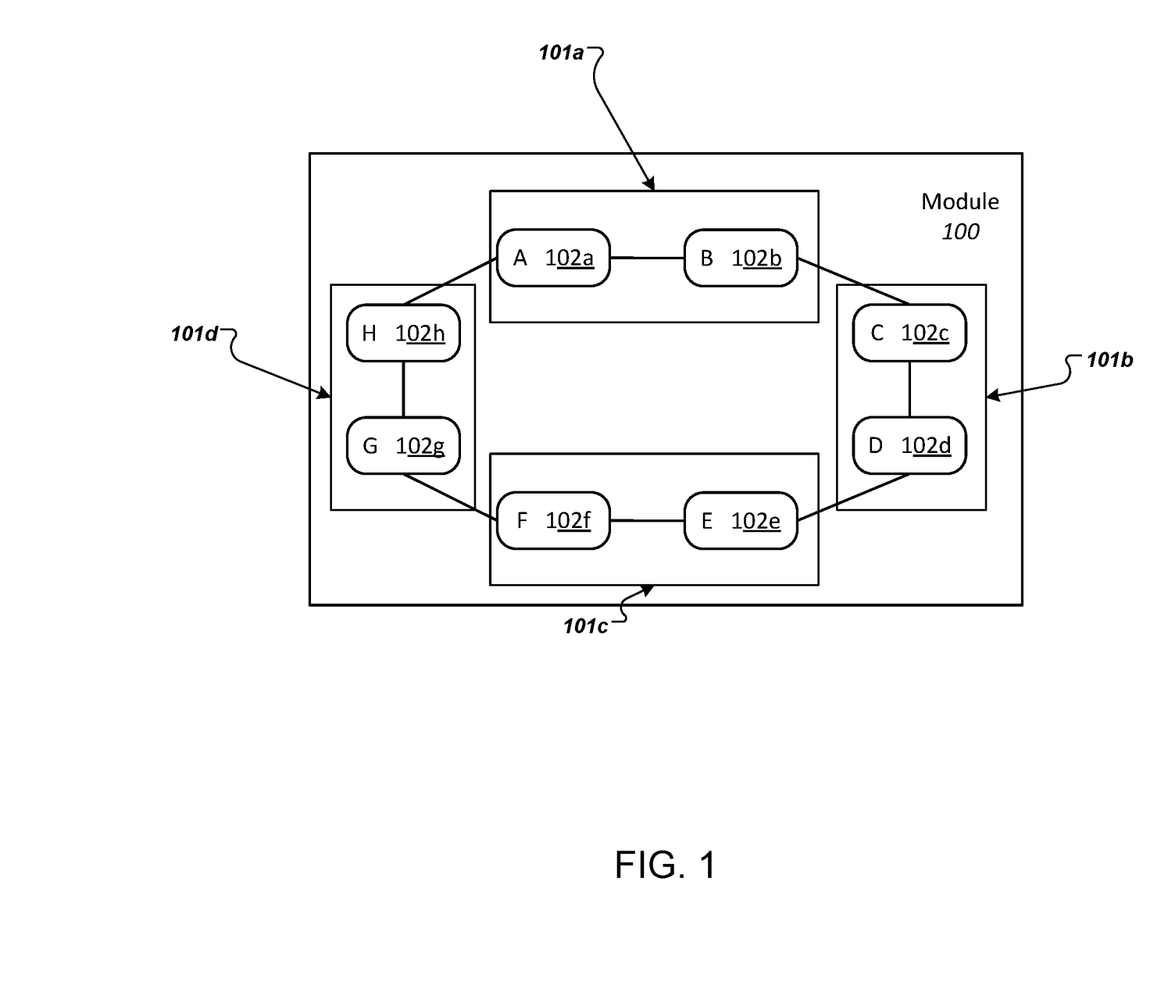
FIG. 1 illustrates an example topology of high-speed connections connecting an example assemblage of special-purpose hardware chips connected in a circular topology on a board.

FIG. 1 illustrates an example topology of high-speed connections connecting an example assemblage of special-purpose hardware chips 101a-101d connected in a circular topology on a board. Each chip contains two processors (102a-h). This topology is a one-dimensional (1D) torus; in a 1D torus, each chip is directly connected to two neighbors. As shown, in some implementations, the chips contain microprocessor cores that have been programmed with software or firmware instructions to perform operations. In FIG. 1, all the chips are on a single module 100. The lines shown in the figure between the processors represent high speed data communication links. The processors are advantageously manufactured on one integrated circuit board, but they can also be manufactured on multiple boards. Across chip boundaries the links are inter-chip network links; processors on the same chip communicate over intra-chip interface links. The links may be half duplex links on which only one processor can transmit data at a time or full-duplex links on which data can be transmitted in both directions simultaneously. Parallel processing using this example topology, and others, is described in more detail in U.S. Patent Application No. 62/461,758, entitled PARALLEL PROCESSING OF REDUCTION AND BROADCAST OPERATIONS ON LARGE DATASETS OF NON-SCALAR DATA, which was filed on Feb. 21, 2017 and is incorporated by reference.

Figure 2:
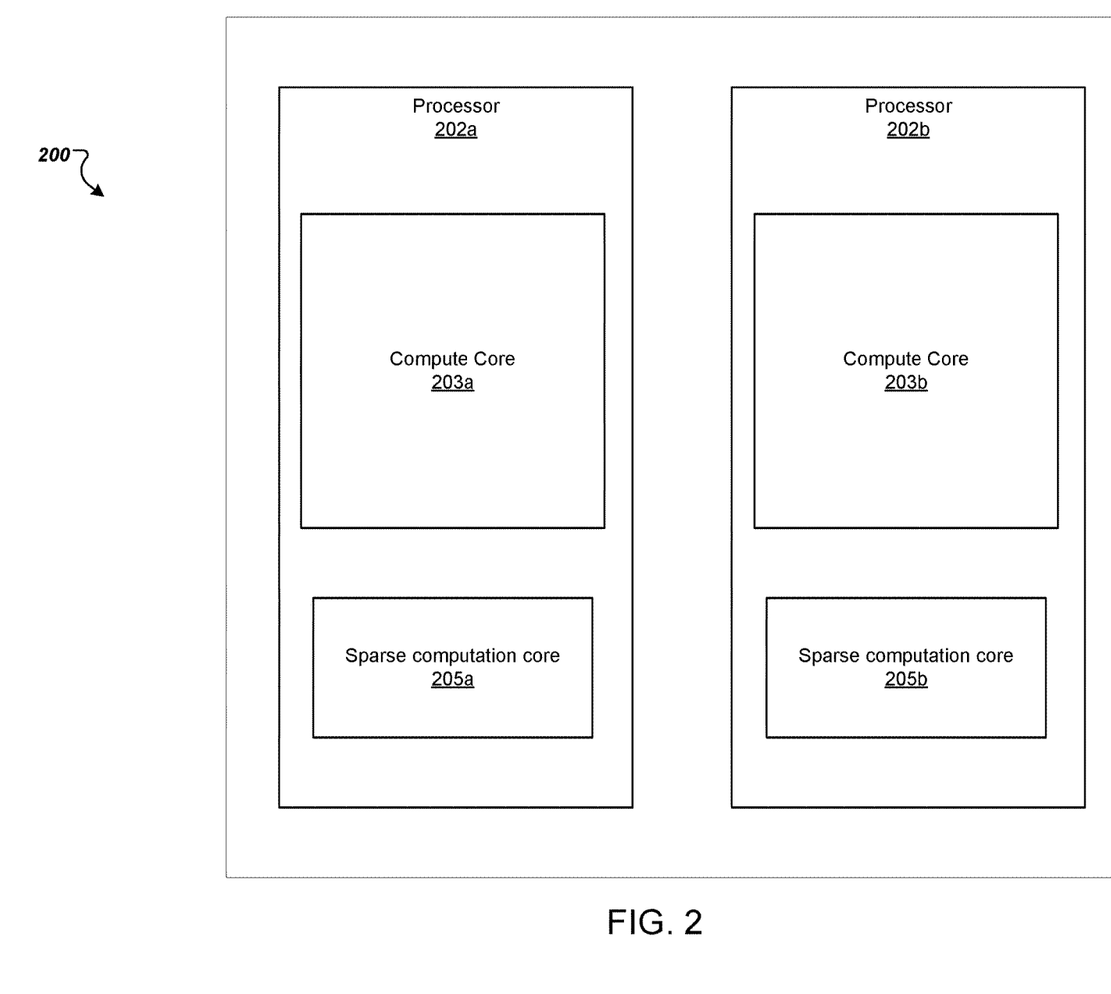
FIG. 2 shows a high-level diagram of an example special-purpose hardware chip for training a neural network.

FIG. 2 shows a high-level diagram of an example special-purpose hardware chip for training a neural network. As illustrated, a single special-purpose hardware chip includes two independent processors (202a, 202b). Each processor (202a, 202b) contains two distinct cores: (1) a compute core, e.g., a very long instruction word (VLIW) machine, (203a, 203b) and (2) a sparse computation core, i.e., an embedding layer accelerator, (205a, 205b).

Each core (203a,b) is optimized for dense linear algebra problems. A single, very long instruction word controls several compute cores in parallel. The compute core will be described in more detail with respect to FIGS. 3 and 4.

An example sparse computation core (205a,b) maps very sparse, high-dimensional data into dense, low-dimensional data so that the rest of the layers process densely packed input data. For example, the sparse computation core can perform the computation of any embedding layers in the neural network being trained.

To perform this sparse-to-dense mapping, the sparse computation core uses a pre-built lookup table, an embedding table. For example, when there is a series of query words as user input, each query word is converted into a hash identifier or a one-hot encoded vector. Using the identifier as a table index, the embedding table returns the corresponding dense vector, which can be an input activation vector to the next layer. The sparse computation core can also perform reduction operations across the search query words to create one dense activation vector. The sparse computation core performs efficient sparse, distributed lookups since the embedding table can be huge and not fit in the limited capacity high bandwidth memory of one of the special-purpose hardware chips. More details about the sparse computation core functionality can be found in the U.S. patent application Ser. No. 15/016,486, entitled MATRIX PROCESSING APPARATUS, which was filed on Feb. 5, 2016 and is incorporated by reference.

Figure 3:
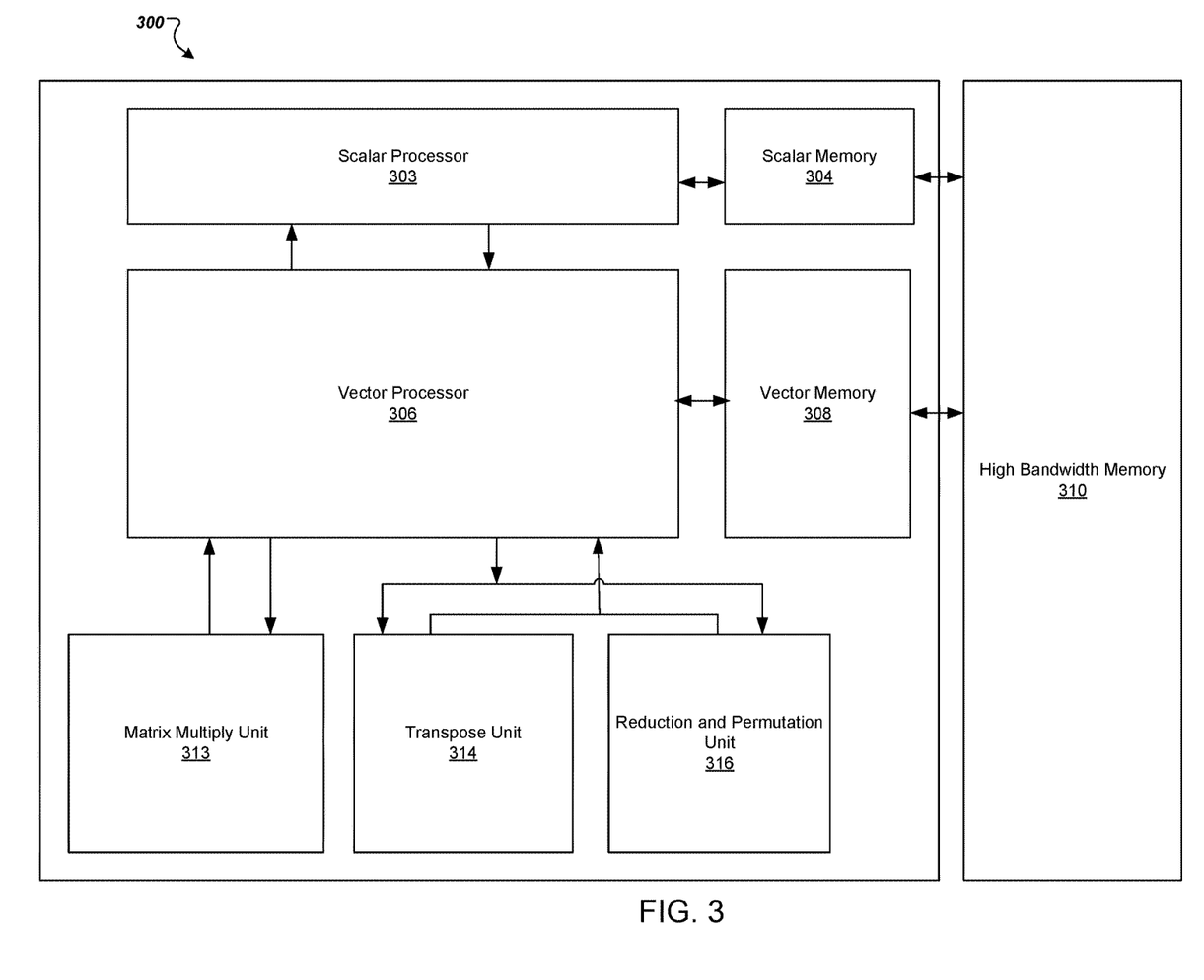
FIG. 3 shows a high-level example of compute core.

FIG. 3 shows a high-level example of compute core (300). The compute core can be a machine, i.e., a VLIW machine, that controls several compute units in parallel. Each compute core (300) contains: a scalar memory (304), a vector memory (308), a scalar processor (303), a vector processor (306), and extended vector units (i.e., a matrix multiply unit (MXU) (313) a transpose unit (XU)(314), and a reduction and permutation unit (RPU) (316)).

An example scalar processor performs VLIW instruction fetch/execute loop and controls the compute core. After fetching and decoding an instruction bundle, the scalar processor itself only executes the instructions found in the scalar slots of the bundle using multiple, multi-bit registers, i.e., 32 32-bit registers, of the scalar processor (303) and scalar memory (304). The scalar instruction set includes normal arithmetic operations, e.g., as used in address calculations, load/store instructions, and branch instructions. The remaining instruction slots encode instructions for the vector processor (306) or other extended vector units (313, 314, 316). The decoded vector instructions are forwarded to the vector processor (306).

Along with vector instructions, the scalar processor (303) can forward values of up to three scalar registers to the other processor and units to perform operations. The scalar processor can also directly retrieve computation results from the vector processor. However, in some implementations, the example chip has a low-bandwidth communication path from the vector processor to the scalar processor.

A vector instruction dispatcher sits between the scalar processor and the vector processor. This dispatcher receives decoded instructions from the non-scalar VLIW slots and broadcasts those instructions to the vector processor (306). The vector processor (306) consists of a two-dimensional array, i.e., 128×8 array, of vector processing units which execute the same instruction in a single-instruction, multiple-data (SIMD) manner. The vector processing unit is described in detail with respect to FIG. 4.

An example scalar processor (303) accesses a small, fast, private scalar memory (304), which is backed up by a much larger, but slower High Bandwidth memory (HBM) (310). Similarly, an example vector processor (306) accesses a small, fast, private vector memory (306), which is also backed up by the HBM (310). Word-granularity access occurs between either the scalar processor (303) and the scalar memory (304) or the vector processor (306) and the vector memory (308). The granularity of loads and stores between the vector processor and the vector memory is a vector of 128 32-bit words. Direct memory access occurs between the scalar memory (304) and the HBM (310) and the vector memory (306) and the HBM (310). In some implementations, memory transfers from the HBM (310) to the processors (303, 306) may only be done through the scalar or vector memories. Additionally there may be no direct memory transfers between the scalar memory and the vector memory.

Instructions may specify extended vector unit operations. Along with each executed vector unit instruction, there are two-dimensional, i.e., 128 by 8, vector units that each can send one register value to the extended vector units as input operands. Each extended vector unit takes the input operands, performs corresponding operations, and returns the results back to the vector processor (306). The extended vector units will be described below with respect to FIG.4.

Figure 4:
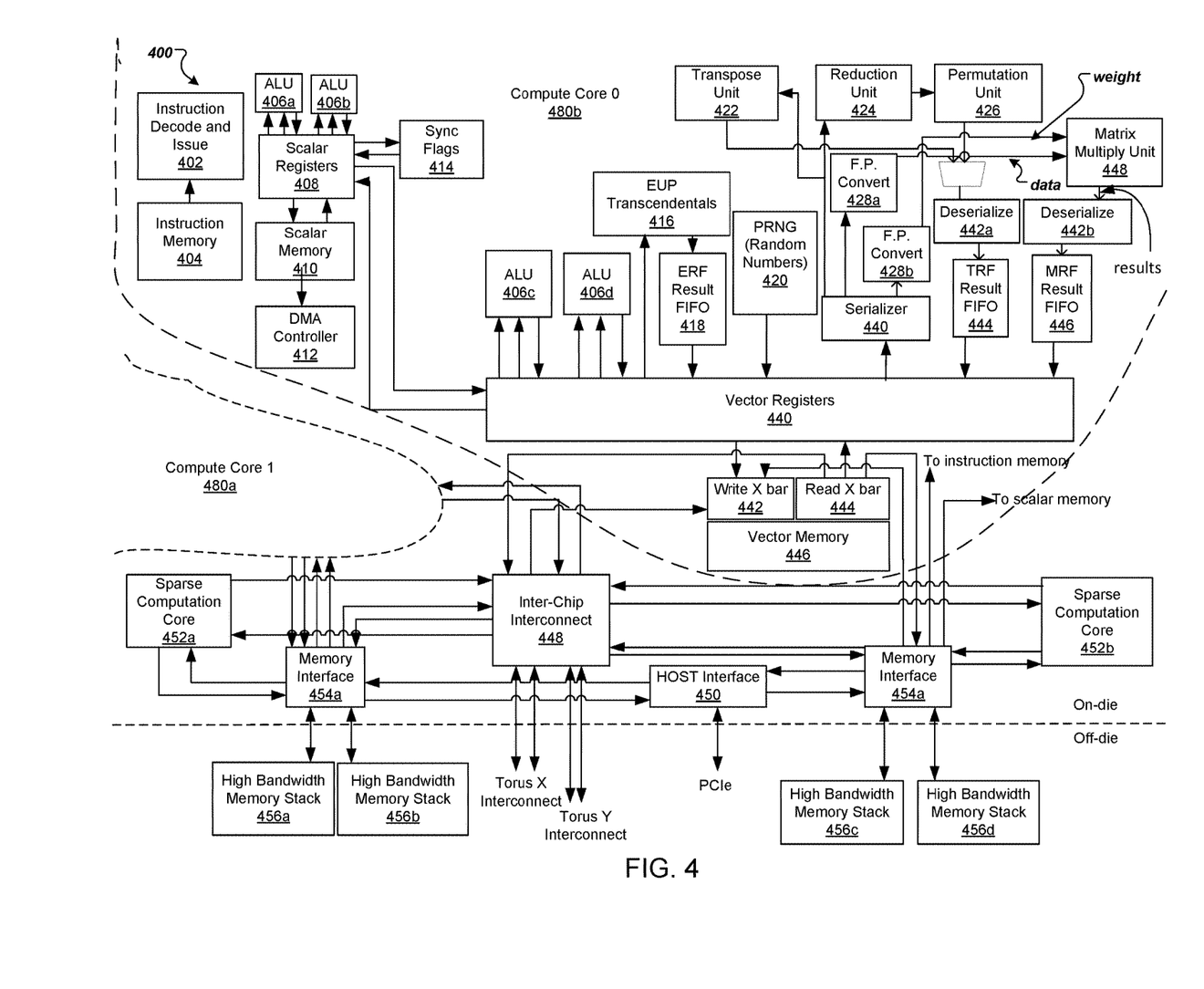
FIG. 4 shows a more detailed diagram of a chip that performs training for neural networks.

FIG. 4 shows a more detailed diagram of a chip that performs training for neural networks. As illustrated and described above, the chip contains two compute cores (480a, 480b) and two sparse computation cores (452a, 452b).

The chip has a shared area which includes an interface to a host computer (450) or multiple host computers. The interface can be a host interface to a host computer or a standard network interface to a network of host computers. The shared area may also have stacks of high bandwidth memory along the bottom (456a-456d), and an inter-chip interconnect (448) connecting the interfaces and memory together, as well as data from other chips. The interconnect may also connect the interface to the compute resources on the hardware chip. Multiple stacks, i.e., two, of high bandwidth memory (456a-b, 456c-d) are associated with each compute core (480a, 480b).

The chip stores data in high bandwidth memory (456c-d), reads the data in and out of vector memory (446), and processes the data. The compute core (480b) itself includes a vector memory (446) that is on-chip S-RAM which is divided into two dimensions. The vector memory has address space in which addresses hold floating point numbers, i.e., 128 numbers that are each 32-bits. The compute core (480b) also includes a computational unit that computes values and a scalar unit that controls the computational unit. The computational unit may comprise a vector processor, and a scalar unit may comprise a scalar processor. The compute core, which may form part of a special purpose chip, may further comprise a matrix multiply unit or another extended operation unit such as a transpose unit (422) which performs a transposition operation of a matrix, i.e., 128×128 matrix, and a reduction and permutation unit.

The vector processor (306) consists of a 2-dimensional array of vector processing units, i.e., 128×8, which all execute the same instruction in a single instruction, multiple-data (SIMD) manner. The vector processor has lanes and sublanes, i.e., 128 lanes and 8 sublanes. Within the lane, the vector units communicate with each other through load and store instructions. Each vector unit can access one 4-byte value at a time. Vector units that do not belong to the same lane cannot communicate directly. These vector units must use the reduction/permutation unit which is described below.

The computational unit includes vector registers, i.e., 32 registers, in a vector processing unit (440) that can be used for both floating point operations and integer operations. The computational unit includes two arithmetic logic units (ALUs) (406c-d) to perform computations. One ALU (406c) performs floating point addition and the other ALU (406d) performs floating point multiplication. Both ALUs (406c-d) can perform various other operations such as shifts, masks, and compares. For example, a compute core (480b) may want to add a vector register, $V_1$, and a second vector register, $V_2$, and put the results in a third vector register, $V_3$. In order to compute the addition, the compute core (480b) performs multiple operations in one clock cycle. Using these registers as operands, each of the vector units can simultaneously execute two ALU instructions, and one load and one store instruction, every clock cycle. A base address for a load or a store instruction can be computed in the scalar processor and forwarded to the vector processor. Each of the vector units in each sublane can compute its own offset address using various methods such as striding and a special indexed address register.

The computational unit also contains an extended unary pipeline (EUP) (416) that performs operations such as square root and reciprocal. The compute core (480b) takes three clock cycles to perform these operations since they are more computationally complex. Since the EUP processing takes more than one clock cycle, there is a first-in-first-out data storage to store results. When an operation is finished, the results are stored in the FIFO. The compute core can use a separate instruction at a later time to pull the data out of the FIFO and put it in the vector register. A random number generator (420) allows the compute core (480b) to generate multiple random numbers per cycle, i.e., 128 random numbers per cycle.

As described above, each processor, which may be implemented as part of a special-purpose hardware chip, has three extended operation units: a matrix multiply unit (448) which performs matrix multiplication operations; a transpose unit (422) which performs a transposition operation of a matrix, i.e., 128×128 matrix, and a reduction and permutation unit (illustrated as separate units in FIG. 4 (424, 426).

The matrix multiply unit performs matrix multiplications between two matrices. The matrix multiply unit (438) takes in data since the compute core needs to load in a set of numbers which is the matrix that is going to be multiplied. As illustrated, data comes from the vector registers (440). Each vector register contains 128×8 numbers, i.e., 32-bit numbers. However, floating point conversion may occur as data is sent to the matrix multiply unit (448) to change the numbers to a smaller bit size, i.e., from 32-bit to 16-bit. A serializer (440) ensures when numbers are read out of the vector registers, the two-dimensional array, i.e., a 128×8 matrix, is read as sets of 128 numbers that are sent to the matrix multiply unit (448) for each of the next eight clock cycles. After the matrix multiply has completed its computations, the results are deserialized (442a,b) which means that result matrix is held for a number of clock cycles. For example, for a 128×8 array, 128 numbers are held for each of 8 clock cycles and then pushed to a FIFO so that a two-dimensional array of 128×8 numbers can be grabbed in one clock cycle and stored in the vector registers (440).

Over a period of cycles, i.e., 128, weights are shifted into the matrix multiply unit (448) as the numbers by which to multiply the matrix. Once the matrix and weights have been loaded, the compute core (480) can send sets of numbers, i.e., 128×8, to the matrix multiply unit (448). Each line of the set can be multiplied by the matrix to produce a number of results, i.e., 128, per clock cycle. While the compute core is performing matrix multiplies, the compute core also shifts new sets of numbers in the background to be the next matrix by which the compute core will multiply so that the next matrix is available when the computational process for the previous matrix has completed. The matrix multiply unit (448) is described in more detail in 16113-8251001, entitled LOW MATRIX MULTIPLY UNIT COMPOSED OF MULTI-BIT CELLS and 16113-8252001, entitled MATRIX MULTIPLY UNIT WITH NUMERICS OPTIMIZED FOR NEURAL NETWORK APPLICATIONS, both of which are incorporated by reference.

The transpose unit transposes a matrix. The transpose unit (422) takes in numbers and transposes them so that the number across a lane is transposed with the number in the other dimension. In some implementations, the vector processor includes 128×8 vector units. Therefore, to transpose a 128×128 matrix, sixteen individual transpose instructions are needed for the full matrix transpose. Once the transposition is finished, the transposed matrix will be available. However, an explicit instruction is needed to move the transposed matrix into the vector register file.

The reduction/permutation unit (or units 424, 426) addresses the problem of cross-lane communication by supporting various operations such as permutation, lane rotation, rotating permutation, lane reduction, permuted lane reduction, and segmented permuted lane reduction. As illustrated, these computations are separate, however, a compute core can use one or the other or one chained to the other. The reduction unit (424) adds up all the numbers in each line of numbers and feeds the numbers into the permutation unit (426). The permutation unit moves data between different lanes. The transpose unit, the reduction unit, the permutation unit, and the matrix multiply unit each take more than one clock cycle to complete. Therefore, each unit has a FIFO associated with it so that the results of computations can be pushed to the FIFO and a separate instruction can be executed at a later time to pull the data out of the FIFO and into a vector register. By using FIFOs, the compute core does not require multiple vector registers to be reserved for the duration of lengthy operations. As illustrated, each of the units takes data from the vector registers (440).

The compute core uses a scalar unit to control the computational unit. The scalar unit has two primary functions: (1) performing loop counting and addressing and (2) generating direct memory address (DMA) requests so that the DMA controller moves data in the background between the high bandwidth memory (456c-d) and vector memory (446) and then to the inter-chip connect (448) to other chips in an example system. The scalar unit contains an instruction memory (404), an instruction decode and issue (402), scalar processing unit (408) that contains scalar registers, i.e., 32-bit, a scalar memory (410), and two ALUs (406a,b) for performing two operations per clock cycle. The scalar unit can feed operands and immediate values into the vector operations. Each instruction can be sent from the instruction decode and issue (402) as an instruction bundle that contains the instructions that execute on the vector registers (440). Each instruction bundle is a very long instruction word (VLIW) with each instruction being a number of bits wide, divided into a number of instruction fields.

The chip 400 can be used to perform at least a portion of the training of a neural network. In particular, when training a neural network, the system receives labeled training data from a host computer using the host interface (450). The host interface can also receive instructions that include parameters for a neural network computation. The parameters can include at least one or more of the following: how many layers should be processed, corresponding sets of weight inputs for each layer of the layers, an initial set of activation inputs, i.e., the training data which is the input to the neural network from which the inference is to be computed or training is to be done, corresponding input and output sizes of each layer, a stride value for the neural network computation, and a type of layer to be processed, e.g., a convolutional layer or a fully connected layer.

The sets of weight inputs and the sets of activation inputs can be sent to the matrix multiply unit of the compute core. Prior to sending the weight inputs and activation inputs to the matrix multiply unit, there may be other computations performed on the input by the other components in the system. In some implementations, there are two ways to send activations from the sparse computation core to the compute core. First, the sparse computation core can send a communication through high bandwidth memory. For a large amount of data, the sparse computation core can store activations in high bandwidth memory using a direct memory address (DMA) instruction, which updates a target synchronization flag in a compute core. The compute core can wait for this synchronization flag using a sync instruction. Once the sync flag is set, the compute core uses a DMA instruction to copy the activations from high bandwidth memory to a corresponding vector memory.

Second, the sparse computation core can send communication directly to the compute core vector memory. If the amount of data is not large (i.e., it fits in the compute core vector memory), the sparse computation core can directly store activations in the vector memory of the compute core using a DMA instruction while notifying a compute core with a synchronization flag. The compute core can wait for this synchronization flag before performing a computation that depends on the activations.

The matrix multiply unit can process the weight inputs and the activation inputs and provide a vector or matrix of outputs to the vector processing unit. The vector processing unit can store a vector or matrix of processed output. For example, the vector processing unit can apply a non-linear function to outputs of the matrix multiply unit to generate activated values. In some implementations, the vector processing unit generates normalized values, pooled values, or both. The vector of processed outputs can be used as activation inputs to the matrix multiply unit for use in a subsequent layer in the neural network.

Once a vector of processed outputs for a batch of training data is computed, the outputs can be compared with the expected output for the labeled training data to determine an error. The system can then perform back propagation to propagate the error through the neural network in order to train the network. The gradient of the loss function is computed using the arithmetic logic units of the vector processing units on-chip.

An example system needs activation gradients to perform back propagation through a neural network. To send activation gradients from a compute core to a sparse computation core, an example system can use a compute core DMA instruction to store activation gradients in high bandwidth memory while notifying the target sparse computation core with a synchronization flag. The sparse computation core can wait for this synchronization flag before performing a computation that depends on the activation gradients.

The matrix multiply unit performs two matrix multiply operations for a back propagation. One matrix multiply applies the back propagated error from the preceding layer in the network along the backward path through the network to the weights to adjust the weights and determine new weights for the neural network. A second matrix multiply applies error to the original activation as feedback to the previous layers in the neural network. The original activations are generated during the forward pass and may be stored for use during the backward pass. For computations, general-purpose instructions in the vector processing unit, including floating-point add, subtract, and multiply can be used. The general-purpose instructions may also include comparisons, shifts, masks, and logical operations. While matrix multiplies can be exceptionally well accelerated, the arithmetic logic units of the vector processing units perform general computations at a rate of 128×8×2 operations per core per cycle.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

Embodiment 1 is a special-purpose hardware chip for training neural networks, the special-purpose hardware chip comprising: a scalar processor configured to control computational operation of the special-purpose hardware chip; a vector processor configured to have a 2-dimensional array of vector processing units which all execute the same instruction in a single instruction, multiple-data manner and communicate with each other through load and store instructions of the vector processor; and a matrix multiply unit that is coupled to the vector processor configured to multiply at least one two-dimensional matrix with a second one-dimensional vector or two-dimensional matrix in order to obtain a multiplication result.

Embodiment 2 is the special-purpose hardware chip of embodiment 1, further comprising: a vector memory configured to provide fast, private memory to the vector processor.

Embodiment 3 is the special-purpose hardware chip of embodiments 1 or 2, further comprising: a scalar memory configured to provide fast, private memory to the scalar processor.

Embodiment 4 is the special-purpose hardware chip of any one of embodiments 1-3, further comprising: a transpose unit configured to perform a transposition operation of a matrix.

Embodiment 5 is the special-purpose hardware chip of any one of embodiments 1-4, further comprising: a reduction and permutation unit configured to perform a reduction on numbers and permute the numbers among different lanes of the vector array.

Embodiment 6 is the special-purpose hardware chip of any one of embodiments 1-5, further comprising: a high-bandwidth memory configured to store data of the special-purpose hardware chip.

Embodiment 7 is the special-purpose hardware chip of any one of embodiments 1-6, further comprising a sparse computation core.

Embodiment 8 is the special-purpose hardware chip of any one of embodiments 1-7, further comprising: an interface; and an inter-chip interconnect, which connects the interface or resources on the special-purpose hardware chip to other special-purpose hardware chips or resources.

Embodiment 9 is the special-purpose hardware chip of any one of embodiments 1-8, further comprising: a plurality of high bandwidth memory; wherein the inter-chip interconnect connects the interface and the high bandwidth memory to other special-purpose hardware chips.

Embodiment 10 is the special-purpose hardware chip of any one of embodiments 1-9, wherein the interface is a host interface to a host computer.

Embodiment 11 is the special-purpose hardware chip of any one of embodiments 1-10, wherein the interface is a standard network interface to a network of host computers.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A special-purpose hardware chip for training neural networks, the special-purpose hardware chip comprising:
   a scalar processor configured to control computational operation of the special-purpose hardware chip;
   a vector processor having a 2-dimensional array of vector processing units; and
   a matrix multiply unit that is coupled to the vector processor and configured to multiply at least a first two-dimensional matrix with a first one-dimensional vector or a second two-dimensional matrix in order to obtain a multiplication result,
   wherein the vector processor includes a plurality of lanes, wherein each vector processing unit of the 2-dimensional array of vector processing units in the vector processor is located in a respective lane of the plurality of lanes, wherein one or more vector processing units of the 2-dimensional array of vector processing units that are located in the same lane are configured to communicate with one another through respective load and store instructions.

2. The special-purpose hardware chip of claim 1, further comprising:
a vector memory configured to provide private memory to the vector processor.

3. The special-purpose hardware chip of claim 1, further comprising:
a scalar memory configured to provide private memory to the scalar processor.

4. The special-purpose hardware chip of claim 1, further comprising:
a transpose unit configured to perform a transposition operation of a matrix.

5. The special-purpose hardware chip of claim 1, further comprising:
a reduction and permutation unit configured to perform a reduction on numbers and permute the numbers among different lanes of a vector array.

6. The special-purpose hardware chip of claim 1, further comprising:
a first memory configured to store data of the special-purpose hardware chip.

7. The special-purpose hardware chip of claim 1, further comprising a sparse computation core.

8. The special-purpose hardware chip of claim 1, further comprising:
an interface; and
an inter-chip interconnect, which connects the interface or resources on the special purpose hardware chip to other special-purpose hardware chips or resources.

9. The special-purpose hardware chip of claim 8, further comprising:
a first memory, wherein the inter-chip interconnect connects the interface and the first memory to other special-purpose hardware chips.

10. The special-purpose hardware chip of claim 8, wherein the interface is a host interface to a host computer.

11. The special-purpose hardware chip of claim 8, wherein the interface is a standard network interface to a network of host computers.

12. The special-purpose hardware chip of claim 8, further comprising a scalar memory and a vector memory.

13. The special-purpose hardware chip of claim 8, wherein a scalar instruction set of the instructions includes arithmetic operations used in address calculations, load/store instructions, and branch instructions, and wherein the remaining instructions of the instructions encode instructions for the vector processor and the matrix multiply unit.

14. The special-purpose hardware chip of claim 1, wherein each vector processing unit in the 2-dimensional array of vector processing units includes 32 registers.

15. The special-purpose hardware chip of claim 1, wherein each vector processing unit in the 2-dimensional array of vector processing units is configured to perform at least one of a floating point operation or integer operation.

16. The special-purpose hardware chip of claim 1, wherein each vector processing unit in the 2-dimensional array of vector processing units is configured to execute two respective arithmetic logic unit (ALU) instructions, a respective load instruction, and a respective store instruction in each clock cycle.

17. The special-purpose hardware chip of claim 16, wherein each vector processing unit in the 2-dimensional array of vector processing units is configured to compute respective offset memory addresses for executing the respective load and store instructions in each clock cycle.

* * * * *